United States Patent [19]

Coulmance

[11] Patent Number: 4,475,012
[45] Date of Patent: Oct. 2, 1984

[54] SUBSCRIBER TELEPHONE SET INCORPORATING OVERVOLTAGE PROTECTION

[75] Inventor: Jean P. Coulmance, Osny, France

[73] Assignee: U.S. Philips Corporation, New York, N.Y.

[21] Appl. No.: 403,590

[22] PCT Filed: Apr. 16, 1982

[86] PCT No.: PCT/NL82/00011
§ 371 Date: Jul. 22, 1982
§ 102(e) Date: Jul. 22, 1982

[87] PCT Pub. No.: WO82/03733
PCT Pub. Date: Oct. 28, 1982

[30] Foreign Application Priority Data

Apr. 16, 1981 [FR] France ............... 81 07673

[51] Int. Cl.³ .................. H04M 1/31; H02H 9/00
[52] U.S. Cl. ....................... 179/81 R; 361/91
[58] Field of Search ............ 179/81 R, 184, 18 FA, 179/16 EA, 16 AA, 18 GF, 90 B, 90 BD, 100 R; 361/56, 57, 110, 111, 91

[56] References Cited

U.S. PATENT DOCUMENTS 3,558,830  1/1971  Bender ..................... 179/81 R
3,925,624 12/1975  Earle et al. ............... 179/81 R

FOREIGN PATENT DOCUMENTS 2158564  7/1973  Fed. Rep. of Germany .
2614019 10/1977  Fed. Rep. of Germany .
2742623  4/1979  Fed. Rep. of Germany .
WO82/00372  2/1982  PCT Int'l Appl. .

Primary Examiner—Gene Z. Rubinson
Assistant Examiner—James L. Dwyer
Attorney, Agent, or Firm—Thomas A. Briody; William J. Streeter

[57] ABSTRACT

Electronically controlled subscriber telephone set which down-stream is protected by two PTC resistors and a VDR which are thermally coupled, is protected upstream of the hook contacts by a power limiting circuit which also acts as a line current interrupter by means of the transmission and dialing circuit.

4 Claims, 5 Drawing Figures

SUBSCRIBER TELEPHONE SET INCORPORATING OVERVOLTAGE PROTECTION

BACKGROUND OF THE INVENTION

Field of the Invention

The present invention relates to a subscriber telephone set incorporating a first overvoltage protection means connected in the said set to the line inputs and also a second protection means provided up-stream of the hook contact intended to limit the power applied to an electronic transmission and dialing circuit associated with a push-button dial.

Although the introduction of electronic circuits in telecommunication equipment marked the beginning of much progress, the solution of certain safety problems among which is the protection against overvoltages, has become more difficult.

Actually, the construction proper of conventional electromechanical apparatus made them capable of resisting overvoltages of several tens, even several hundreds of volts, so that it was possible to use a simple and effective protection means such as spark arresters. This does not hold for equipment provided with electronic circuits which do not tolerate overvoltages which have been permissible so far.

This situation lead to the use of protection means, either active means formed by electronic circuits, or passive means formed by components having a non-linear characteristic.

The present-day protection circuits are not adequate to protect a subscriber set fully, as they cannot resist considerable overvoltages such as overvoltages which may be produced by, for example, inadvertent contact of a telephone line with an electric power mains cable.

The passive means such as voltage-dependent resistors (VDR) and positive temperature-coefficient resistors (PTC) render a less costly and effective protection possible. It is actually sufficient to provide at the input of the telephone set two PTC resistors arranged in series in each of the line conductors and a VDR in parallel with and down-stream to them. In the event of a line overvoltage the resistance of the VDR drops considerably, which causes a considerable current to circulate in the PTC whose warming-up increases the line impedance significantly.

However, the protection thus obtained is not complete in the case where the telephone set incorporates electronic circuits. It is known that the call procedure of a telephone set from the exchange is effected by applying a 50 Hz a.c. voltage of the order of 70 to 80 volts to the line. After the receiver has been lifted from the set the d.c. line voltage establishes itself at approximately 10 volts, which is the voltage from which the several electronic circuits of the telephone set are supplied.

If it is desired to maintain a normal operation of the ringing circuit the "knee" voltage of the VDR must not be lower than approximately one hundred volts, which means that an overvoltage below this value may be applied, in the "off-hook" condition of the set, to the electronic circuits of the subscriber set without the protection means responding.

If the electronic circuits are provided with internal supply voltage limiting and stabilizing means there is every risk that a prolonged overvoltage may cause the destruction of one or several circuits due to an excess current.

So as to satisfy the most severe requirements, two protection devices are employed at present, as mentioned in French Patent Specification No. 2132175, one of which limits the voltage at the line inputs of the telephone set, the other one being provided downstream of the hand set to further reduce the power admitted to the electronic circuits which have for their function to process the transmission and dialing signals.

The fact remains that the apparatus such as it is described in the said Patent Specification may still be damaged when a prolonged overvoltage is applied to its terminals.

One of the objects of the invention is to protect a subscriber set from all possibilities of being put out of order or destruction resulting from an overvoltage of any value.

A further object of the invention is to make advantageous use of one of the embodiments of the protection device to effect the dialing procedure by periodically cutting-off the line current.

According to the invention, a telephone set incorporating a first overvoltage protection device connected in the said set, to the line inputs, also incorporating a second protection device provided downstream of the hand set, intended to limit the power applied to an electronic transmission and dialing circuit associated with a push-button dial, is characterized in that the said second protection device is in essence formed by a dipole electronic circuit arranged in series with one of the inputs of the said transmission and dialing circuit, by means of a dialing interrupter, this dipole circuit comprising a first transistor whose main current path is connected to one of the terminals of the dipole via a current measuring resistor, and to the other terminal of the dipole via a diode which forms together with a second transistor whose polarity is the reverse of the polarity of the first transistor, a current mirror supplying the control electrodes of the first transistor, while a third transistor is arranged in parallel with the control electrode of the first transistor which responds when the current flowing through the current measuring resistor reaches a predetermined value.

In accordance with an advantageous operating mode the dipole electronic circuit comprises a fourth transistor which acts on the control electrode of the first transistor to cut the latter off when the voltage at the terminals of the dipole circuit exceeds a predetermined threshold voltage.

Advantageously, the dipole power limiting electronic circuit has a current limiting auxiliary terminal connected to the transmission and dialing circuit. Alternatively, the dipole electronic circuit may also constitute the dialing interrupter, the line interrupting control terminal being connected to the control electrode of the first transistor by means of a diode which forms a current mirror together with a fifth transistor.

Thanks to its very short response time and to its particular characteristics, the second protection device ensures, in combination with the first device, complete safety against prolonged or short overvoltages, whether the set is in the on-hook or the off-hook condition. In addition, the construction of this second protection device is simple even for the case where it also performs the dialing function by periodical interruptions of the line current. It is therefore possible to integrate this circuit, either separately, or in the incorporated form in the integrated transmission/dialing circuit.

The following description given by way of example with reference to the accompanying drawings will make it better understood how the invention can be put into effect.

DESCRIPTION OF THE PREFERRED EMBODIMENTS

Figure 1:
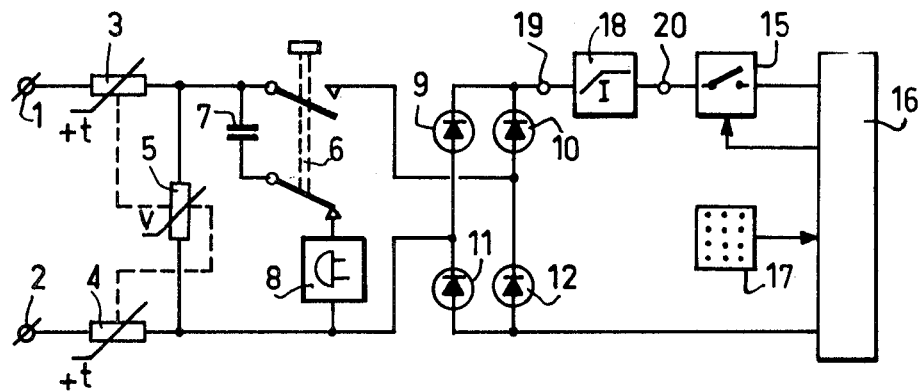
FIG. 1 shows the circuit diagram of a subscriber set incorporating two protection devices.

In FIG. 1, two terminals 1 and 2 for connection to the telephone line are connected to a voltage dependent resistor (VDR) 5 via two positive temperature-coefficient resistors (PTC) 3 and 4, these three resistors being thermally coupled. The common switching contacts of a dual receiver interrupter 6 (hand set) are connected to the junction of the resistors 3 and 5, one directly and the other one via a dialing capacitor 7 which is associated with a dialing circuit 8 provided between the relevant make contact of the hand set 6 and the junction between the resistors 4 and 5. The two inputs of a diode bridge 9, 10, 11, 12 are connected one to the other make contact of the hand set 6 and the other one to the junction between the resistors 4 and 5.

Arranged between the output terminals of the bridge 9, 10, 11, 12 there is a transmission and dialing circuit 16 one input of which comprises, arranged in series, a dipole electronic circuit 18 performing the function of the second protection device, and a dialing interrupter 15. In addition, the circuit 16 has a dialing input connected to a push-button dial 17, and a periodical interruption control output connected to the interrupter 15.

Disregarding the dipole circuit 18, whose structure and operation will be described hereinafter, the subscriber set of FIG. 1 operates as follows: in the rest condition, the hand set 6 is in the position shown in the circuit diagram so that an a.c. ringing signal applied to the terminal 1 and 2 can energize the circuit 8 via the capacitor 7; when the subscriber lifts the hand set from its cradle the ringing circuit is interrupted and the line is connected to the circuit 16 via the dipole circuit 18 and the interrupter 15 in the "closed" position; the call is established. In the call procedure, after having lifted the hand set from its cradle the subscriber composes the number on the dial 17, which, after processing by the circuit 16, conveys control pulses to the interrupter 15 so as to effect the periodical interruptions of the line current which are decoded by the exchange.

In normal operation, the value of the cold resistance of the PTC resistors 3 and 4 is so low that they may be substantially disregarded compared with the overall impedance of the subscriber set. The value of the threshold voltage of the VDR 5 will obviously be chosen higher than the a.c. peak voltage for energizing the bell 8, which is of the order of 80 volts; in these conditions, if an inadvertent overvoltage is produced on the line connected to the terminals 1 and 2 the value of the VDR 5 decreases considerably and a current then flows through the PTC resistors 3 and 4.

If the overvoltage is of a very short duration, the VDR 5 and the PTC resistors 3 and 4 are not allowed sufficient time to warm up and the normal operation is immediately reestablished; if in contrast therewith the overvoltage is permanent two possibilities are created:

1. the overvoltage has a value which is sufficient to induce in the PTC resistors 3 and 4 the flow of a current which is higher than the triggering threshold of the said PTC resistors, generally more than 100 mA; in these circumstances, the resistances of the PTC resistors 3 and 4 considerably increases and the protection is effective, 2. the value of the overvoltage is insufficient to induce the flow of a current higher than the triggering threshold of the PTC resistors, but which is nevertheless sufficient to cause in the long run the destruction of the VDR 5 due to heating.

This second possibility is mitigated by the thermal coupling between the PTC resistors 3 and 4 and the VDR 5, heating of the latter being rapidly transferred to the PTC resistors, causing them to become operative.

When the hand set 6 is in the rest position, the ringing circuit 8 is then perfectly protected from any overvoltage.

This does not hold for the "off-hook" condition for the subscriber set circuits down-stream of the hand set 6. The value of the overvoltage is indeed limited to approximately 200 volts by the VDR 5 while the nominal supply voltage of the circuit 16 is of the order of some tens of volts; as a result thereof, a prolonged overvoltage in the "off-hook" position entails the risk of destruction of the circuit 16 by excess current in the region of the Zener diodes which fix the internal operating voltages of the said circuit.

According to the invention, such a possibility is rendered impossible by the presence of the second protection device in the form of the dipole electronic circuit 18 which limits the current applied to one of the inputs of the circuit 16.

In the absence of an overvoltage, the dipole limiting circuit 18 behaves as a pure low-value resistor with respect to the current consumed by the circuit 16 during normal operation; from a certain current value in connection with the presence of an overvoltage this overvoltage does not increase any further while the voltage between the terminals 19 and 20 continues to increase to a certain value at which the current suddenly becomes substantially zero; at that instant, the circuit 18 behaves in practice as an interrupter in the open state whose voltage at the terminals 19 and 20 is in any case limited by the up-stream VDR 5. From the disappearance of the overvoltage the circuit 18 immediately reassumes its former characteristic.

Figure 2:
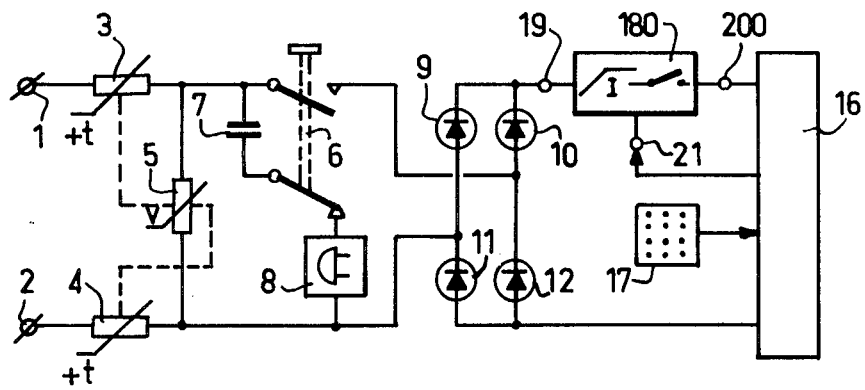
FIG. 2 shows a variation of the embodiment of the telephone set shown in FIG. 1 incorporating in the second protection device the system of dialing by means of periodical interruptions of the line current.

In FIG. 2, whose reference numerals are the same as those in FIG. 1, a limiter/interrupter circuit 180 is arranged between the terminal 19 and a line input terminal 200 of the circuit 16, the said circuit 180 having an interruption control terminal 21.

The circuit 180 combines the functions of the interrupter 15 and the limiter circuit 18 of FIG. 1; during normal operation it behaves as a transmitter transmitting dialing pulses produced by the circuit 16 when the dial 17 is energized by the subscriber and, in the presence of an overvoltage, it assumes the power limiting function in the manner described in the foregoing.

Figure 3:
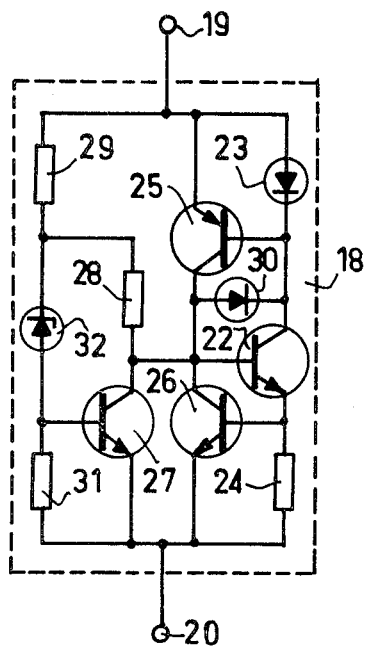
FIG. 3 shows the circuit diagram of a current limiting device provided in the subscriber set of FIG. 1.

In FIG. 3, the reference numerals of which correspond to those of FIG. 1, the limiting circuit 18 comprises a first transistor 22 of the NPN type whose collector is connected to the cathode of a diode 23, the anode of the latter being connected to the input terminal 19; the emitter of the transistor 22 is connected to the output terminal 20 via a resistor 24.

A second and a third transistor 25 and 26, of the respective types PNP and NPN are arranged in series between the terminals 19 and 20, the respective emitters being connected to the terminals. The base of the transistor 25 is connected to the collector of the transistor 22 and the base of the transistor 26 is connected to the emitter of transistor 22.

A fourth transistor 27, of the NPN type has its emitter connected directly to the terminal 20, while the collector is connected to the terminal 19 via the two series-arranged resistors 28 and 29.

The combined collectors of the three transistors 25, 26 and 27 are connected on the one hand to the base of the transistor 22 and on the other hand to the anode of a diode 30 whose cathode is connected to the collector of the transistor 22. The base of the transistor 27 is connected to the terminal 20 via a resistor 31, and also to the anode of a Zener diode 32 whose cathode is connected to the junction between the resistors 28 and 29.

The circuit 18 in accordance with the invention operates as follows: when a voltage is applied to the circuit, the base of the transistor 22 is supplied with power via the resistors 28 and 29, and the collector current of the transistor 22 flows through the diode 23 of the current mirror formed by the said diode and the transistor 25; the collector current of the transistor 25 feeding the base of the transistor 22, the assembly stabilizes itself in a conducting state near complete saturation.

The diode 30, whose presence is optional, diverts a portion of the base current of the transistor 22 which makes it possible to reduce the reblocking period of the circuit. When the voltage drop across the terminals of the resistor 24 increases, transistor 26 starts supplying current and the collector current of the transistor 25 is then distributed between the base of the transistor 22 and the collector of the transistor 26; the current output of the transistor 22 stabilizes and the voltage between the terminals 19 and 20 increases. As, due to the current mirror 23, 25 the collector current of the transistor 26 is proportional to the collector current of the transistor 22 it is ultimately the whole of these currents which is stabilized.

When the voltage between the terminals 19 and 20 exceeds the value of the product of the Zener voltage of the diode 32 and $$\frac{R28 + R29}{R29},$$

the transistor 27 starts supplying current and rapidly reaches saturation, thus cutting-off transistor 22. The non-conducting state is sufficient to enable the flow of a current in the base of the transistor 27.

Figure 4:
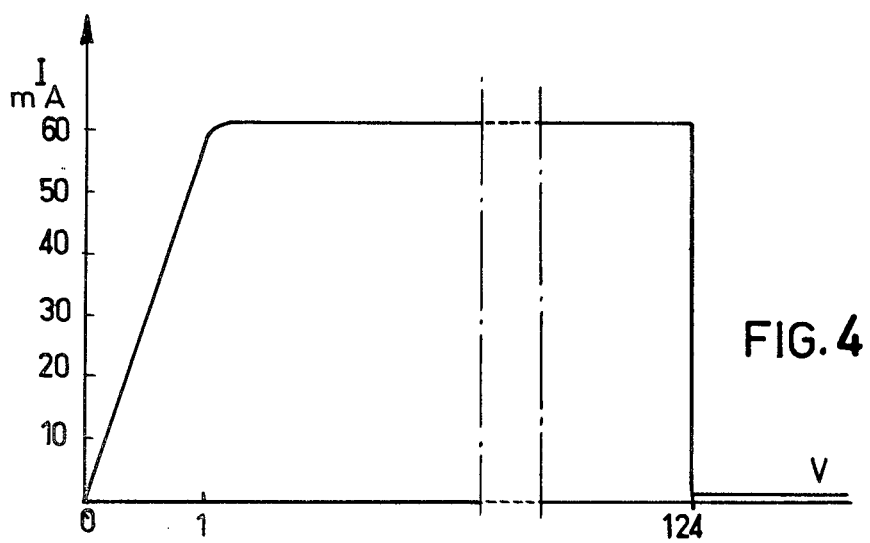
FIG. 4 shows the current/voltage characteristic of the arrangement of FIG. 3.

FIG. 4 illustrates the three operating stages of the circuit shown in FIG. 3.

For a variation between zero and 1.6 Volts of the voltage between the terminals 19 and 20 which corresponds to the normal operation of the telephone set the current variation is linear, the slope of this variation being in practice determined by the value of the resistor 24.

Starting from 1.6 Volts until a threshold value which is chosen optionally, for example 124 Volts, the current stops increasing and is limited to approximately 60 mA.

A 124 Volts, the current decreases suddenly and remains limited to a very low value which is predominantly determined by the saturation current of the transistor 27 limited by the series arrangement of the resistors 28 and 29. The protection is then total as the current flowing between the terminals 19 and 20 is interrupted substantially at the instant at which the power dissipated in the circuit threatens to destroy it in the long run.

Figure 5:
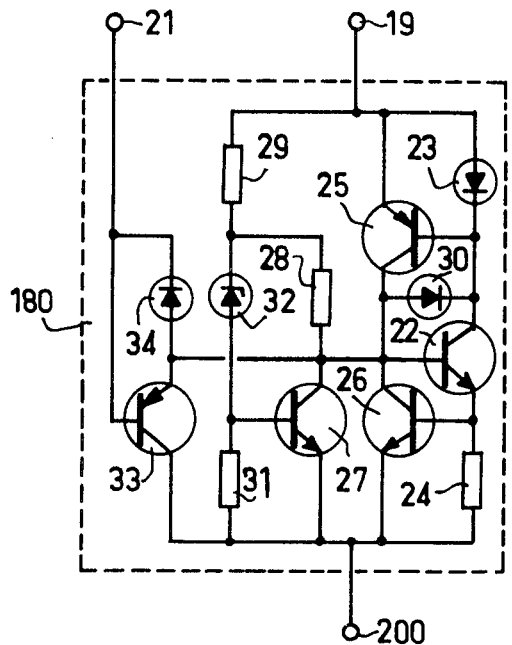
FIG. 5 shows the circuit diagram of a combined current limiting/interrupting device provided in the subscriber set of FIG. 2.

In FIG. 5 whose reference numerals are the same as those in the FIGS. 1, 2 and 3 the combined limiting/interrupting circuit 180 comprises the same components energized in the same way as circuit 18 of FIG. 3 to which a control transistor 33, of the PNP type, is added, whose collector is directly connected to the output terminal 20 and whose emitter is furthermore connected to the base of the transistor 22 and to the interconnected collectors of transistors 25, 26 and 27.

The base of transistor 33 is connected to the interruption control terminal 21 and also to the cathode of a diode 34 whose anode is connected to the emitter.

When the terminal 21 is at a potential which is slightly higher than the potential on the output terminal 200, transistor 33 is cutoff and the limiting circuit operates in the same manner as circuit 18 of FIG. 3. When the control terminal 21 has a negative voltage compared with the terminal 200 the transistor 33 is brought to saturation, as a result of which transistor 22 is cutoff, and consequently the current flowing between the terminals 19 and 200 is interrupted; it is therefore sufficient to apply to the terminal 21 negative voltage pulses which as regards duration, number and rate are compatible with the standardized dialing signals to establish the communication.

I claim:

1. In a subscriber telephone set comprising line inputs, hook contacts, and an electronic transmission and dialing circuit associated with a push button dial and incorporating a first overvoltage protection means connected in said set to the line inputs and also a second protection means provided up-stream of the hook contacts, intended to limit the power applied to said electronic transmission and dialing circuit associated with a push-button dial, the improvement wherein said second protection device is in essence formed by a dipole electronic circuit arranged in series with one of the inputs of the transmission and dialing circuit, by means of a dialing interrupter, this dipole circuit having first and second terminals and comprising a first transistor whose main current path is connected to one of the terminals of the dipole circuit via a current measuring resistor, and to the other terminal of the dipole circuit via a diode which forms together with a second transistor whose polarity is the reverse of the polarity of the first transistor a current mirror supplying the control electrode of the first transistor, while a third transistor is connected between the one terminal of the dipole circuit and the control electrode of the first transistor, said third transistor becoming conductive when the current flowing through the current measuring resistor reaches a predetermined value.

2. The invention as claimed in claim 1 wherein the dipole electronic circuit comprises a fourth transistor which acts on the control electrode of the first transistor to cut off the latter when the voltage at the terminals of the dipole circuit exceeds a predetermined threshold voltage.

3. The invention as claimed in claim 1 wherein the dipole electronic circuit further comprises a line interruption control terminal and a fifth transistor and also forms the dialing interrupter, the line interruption control terminal being connected to the control electrode of the first transistor via a diode which together with the fifth transistor forms a current mirror.

4. The invention as claimed in claim 1 further comprising a second diode having its anode connected to the collector of said second transistor and its cathode connected to the collector of said first transistor.

* * * * *